(12) United States Patent
Huang

(10) Patent No.: US 8,530,612 B2
(45) Date of Patent: Sep. 10, 2013

(54) SYNTHESIS OF POLYESTERS WITH PRECISELY SEQUENCED TWO OR MORE STRUCTURAL UNITS

(75) Inventor: Bin Huang, Fremont, CA (US)

(73) Assignee: Molecon, Inc., Union City, CA (US)

( * ) Notice: Subject to any disclaimer, the term of this patent is extended or adjusted under 35 U.S.C. 154(b) by 182 days.

(21) Appl. No.: 12/993,242

(22) PCT Filed: May 13, 2009

(86) PCT No.: PCT/US2009/043805
§ 371 (c)(1), (2), (4) Date: Feb. 28, 2011

(87) PCT Pub. No.: WO2009/142978
PCT Pub. Date: Nov. 26, 2009

(65) Prior Publication Data
US 2011/0190470 A1     Aug. 4, 2011

Related U.S. Application Data

(60) Provisional application No. 61/054,218, filed on May 19, 2008.

(51) Int. Cl.
*C08G 63/06*     (2006.01)

(52) U.S. Cl.
USPC .......................................................... 528/361

(58) Field of Classification Search
USPC .......................................................... 528/361
See application file for complete search history.

(56) References Cited

U.S. PATENT DOCUMENTS

| | | |
|---|---|---|
| 3,773,737 A | 11/1973 | Goodman et al. |
| 3,960,152 A | 6/1976 | Augurt et al. |
| 4,243,775 A | 1/1981 | Rosensaft et al. |
| 4,441,496 A | 4/1984 | Shalaby et al. |
| 4,481,353 A | 11/1984 | Nyilas et al. |
| 4,737,550 A | 4/1988 | Tomalia et al. |
| 4,857,599 A | 8/1989 | Tomalia et al. |
| 4,916,193 A | 4/1990 | Tang et al. |
| 4,916,209 A | 4/1990 | Fung et al. |
| 4,920,203 A | 4/1990 | Tang et al. |
| 4,994,551 A | 2/1991 | Fung et al. |
| 5,030,703 A | 7/1991 | Pielartzik et al. |
| 5,041,516 A | 8/1991 | Frechet et al. |
| 5,066,772 A | 11/1991 | Tang et al. |
| 5,120,802 A | 6/1992 | Mares et al. |
| 5,145,945 A | 9/1992 | Tang et al. |
| 5,152,781 A | 10/1992 | Tang et al. |
| 5,256,762 A | 10/1993 | Hermes et al. |
| 5,349,047 A | 9/1994 | Hermes et al. |
| 6,313,235 B1 | 11/2001 | Kuo et al. |
| 6,489,434 B2 | 12/2002 | Jen |
| 6,913,806 B2 | 7/2005 | Jen |
| 7,297,721 B2 | 11/2007 | Kulkarni |
| 2006/0009611 A1 | 1/2006 | Hayes |
| 2006/0178477 A1 | 8/2006 | Neuenschwander |
| 2007/0249654 A1 | 10/2007 | Bourissou et al. |
| 2011/0213100 A1 | 9/2011 | Huang et al. |

FOREIGN PATENT DOCUMENTS

| | | |
|---|---|---|
| EP | 0684961 B1 | 11/1998 |
| GB | 1528133 A | 10/1978 |
| JP | 5262866 A | 10/1993 |
| WO | WO 2007/089779 A2 | 8/2007 |
| WO | WO 2007/089779 A3 | 9/2007 |

OTHER PUBLICATIONS

Clark, et al. Reactions of potassium fluoride in glacial acetic acid with with chlorocarboxylic acids, amides, and chlorides. The effect of very strong hydrogen bonding on the nucleophilicity of the fluoride anion. J Chem Soc. 1975; 2129-2134.
International search report and written opinion dated May 6, 2010 for PCT application No. PCT/US2009/056222.
International search report and written opinion dated Aug. 5, 2009 for PCT application No. PCT/US2009/043805.
Moorlag, et al. (S)-2-Chloropropanoyl chloride. A convenient reagent for the determination of the enantiomeric composition of x-Substituted x-hydroxy acids. Recueil des Travaux chimiques des pays-bas. 1990; 109(9):479-480.
Wang, et al. Oxygen permeability of biodegradable copolycaprolactones. Polymers for advanced technologies. 1999; 10(5):282-286.

*Primary Examiner* — Kuo-Liang Peng
(74) *Attorney, Agent, or Firm* — Fox Rothschild LLP; Jianming Jimmy Hao

(57) ABSTRACT

The present invention related to compositions and methods of producing polyesters with two and/or more different structural units and the materials of polyesters with structure sequence exactly specified therefore produced, and various articles produced from such exactly sequenced polyesters. More particularly, homogeneous copolymers with precisely defined sequences of various hydroxyl acids and their derivatives are produced according to the present invention.

22 Claims, 1 Drawing Sheet

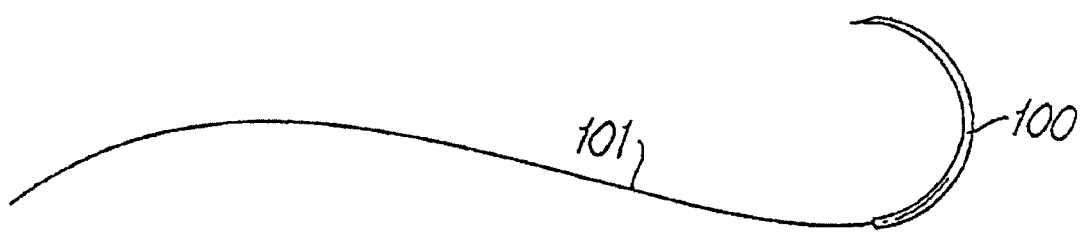

SYNTHESIS OF POLYESTERS WITH PRECISELY SEQUENCED TWO OR MORE STRUCTURAL UNITS

CROSS-REFERENCE TO RELATED APPLICATIONS

This application is a U.S. national phase application of International Application No. PCT/US2009/043805, filed on May 13, 2009, which claims the benefit of U.S. Provisional Application No. 61/054,218, filed on May 19, 2008, the contents of which are hereby incorporated by reference in their entirety.

FIELD OF THE INVENTION

The present invention relates to compositions and methods for producing polyesters with two and/or more different structural units and the materials of polyesters with structure sequence exactly specified therefore produced, and various articles produced from such exactly sequenced polyesters. More particularly, homogeneous copolymers with precisely defined sequences of various hydroxyl acids and their derivatives are produced according to the present invention.

BACKGROUND OF THE INVENTION

In the field of biodegradable polymers for biomedical applications, such as biodegradable medical devices or the time controlled release of drugs, one of the biggest challenges is related to controlling the polymer properties for a given application. Crystallinity, solubility, molecular weight (MW), molecular weight distribution (MWD) and chemical structure of repeat units of polymers play important roles in such controlling the required properties. To meet specific requirements of the designed application, two or more different monomers, e.g. glycolide and lactide, are randomly copolymerized to produce random copolymers in various ratios to produce the required properties. However, the polymer chain of such a copolymer is heterogeneous because the polymer chains are randomly assembled. The repeatability and reproducibility of the release profile of drug system with such a copolymer are affected by the random nature of the polymerization reaction and the resulting random polymers.

Polyglycolic acid and polylactic acid are generally prepared from the cyclic diester of glycolic acid (glycolide) and lactic acid (lactide), respectively by ring opening addition polymerization in the presence of a catalyst, e.g., stannous octoate. In order to obtain copolymers, an often utilized route is the copolymerization with ring opening of the glycolide and lactides (L and D-Iactides) in the presence of tin 2-ethyl hexanoate.

Poly(lactide-co-glycolide) polymers therefore produced are heterogeneous, i.e., they are made up of a random sequence of lactate and glycolate structural units and it is statistically improbable any two chains will be identical. Ordinarily, properties of such copolymers are based, in part, upon the concentration of lactide and glycolide present in the starting reaction mixture. In addition, the formation of the copolymer is complicated by the fact that the reactivity of glycolide and lactide are different.

Formation of polyglycolic acid has been also reported by reaction of haloacetic acid with amine in solution at room temperature (Subramanyam et al, Journal of Polymer Science: Polymer Chemistry Edition, 22:1131, 1984) or by melting the sodium salt of halide substituted acetic acid at temperature of 150~185° C. (Epple et al, Macromol. Chem. Phys. 200:2221, 1999). Nevertheless, copolymers of haloacetic acid and haloproponic acid or poly(lactide-co-glycolide) have never been demonstrated with these methods, maybe because of the reactivity difference between the different monomers in these polymerization methods.

Gilding et al. have reported that pure polyglycolide is about 50% crystalline and pure poly-L-lactide is about 37% crystalline. (Polymer, 20:1459 (1979)). It has been also reported that poly(lactide-co-glycolide) polymers are amorphous between the compositional range of from 25 to 75 mole percent glycolide. This observation is explained by the amorphous character of the copolymer. To obtain crystallinity, extensive lengths of the chain need steric regularity which may be achieved with precise sequence control.

An attempt to provide a copolymer having a controlled sequence of alternating units of lactic acid and polyglycolic acid was described in U.S. Pat. No. 3,960,152 (the "152 patent"). According to the '152 patent, lactic acid and glycolic acid are formed into a cyclic diester (3methyl-1,4-dioxane-2,5-dione). When the cyclic diester is opened and added to a polymer chain, the lactic acid unit and glycolic acid unit are said to be adjacent in the polymer chain. However, there is no way to control the ring opening polymerization such that the ring opens at the same position every time. Thus, the ring opening and subsequent addition cannot be strictly uniform and the final product does not contain regularly alternating lactic acid units and glycolic acid units, i.e., the resulting polymer is not homogeneous. Moreover, the application of the method in the '152 patent is limited to those copolymers with two structural units only.

In U.S. Pat. No. 5,349,047 (the "047 patent") Hermes and Huang described polyesters having predetermined monomeric sequence which are produced by stepwise addition of monomeric hydroxyacids to a growing polymeric chain. In the '047 patent, the bifunctional hydroxyacids monomers are protected with different protection methods for its hydroxyl group and carboxyl group respectively. By selective deprotection, the monomer units are free to be added into the growth polymer chain or to be added by another monomer unit. With such a protection/deprotection approach, polyesters can be produced in any designed sequences. However, the longest polymer chains demonstrated by stepwise addition have only 16 structural units with MW of 2081 g/mol which is not enough to be utilized in practical application.

Therefore, there is a need to explore other methodology for constructing polyesters having a predetermined sequence of structural units.

SUMMARY OF THE INVENTION

The present invention provides polyesters with precisely sequenced two or more structural units with high molecular weight (e.g., more than 5,000 g/mol). Exemplary polyesters of the invention are produced by condensation polymerization from bifunctional oligomers of two or more structural units with base at temperatures below 100° C. Hydroxyacids, e.g., glycolic acid, lactic acid and hydroxybutyric acid, are esterified to form oligomers of carefully regulated sequence in which one end is functionalized with a carboxyl group and another end is functionalized with halide (or other leaving group) as a functional group. Exemplary sequential polyesters polymerized from the oligomers have precisely engineered sequential arrangements which allow control over their rates of hydrolysis, crystallinity and other associated chemical and physical properties. In some embodiments, preparation of sequential oligomers according to the present invention may be commenced by 1) halidation of the halocarboxylic acid and its reaction with a hydroxyacid; or 2) blocking or protecting the hydroxyl group of a first hydroxyacid. In one embodiment, dimer formation is accomplished by activating the carboxyl terminus of the first hydroxyacid so that esterification with a second optionally carboxyl-protected hydroxyacid occurs under appropriate reaction conditions. If protected, the carboxyl group of the second hydroxyacid is deprotected to allow subsequent addition of a third carboxyl-protected hydroxyacid. Stepwise addition of further optionally carboxyl protected hydroxyacids allows the sequence of the resulting homogeneous oligomer to grow and be carefully regulated. Exemplary oligomers obtained this way have protected hydroxyl at one end and carboxyl group at another end. In various embodiments, the hydroxyl and carboxyl protection group are then deprotected to give free hydroxyl and carboxyl functional group. In various embodiments, the invention provides branched oligomers, e.g., s dendritic oligomers. Branched oligomerscan be manufactured by incorporation of hydroxy polycarboxylic acids into a growing oligomer having predetermined monomeric sequence. The free deprotected oligomers are then reacted with a halocarbonyl halide to form a halocarboxylic acid oligomer. Such a halocarboxylic acid oligomer is then ready to be polymerized with a base. The present invention provides exactly sequenced polyesters, exactly sequenced halocarboxylic acid oligomer, methods of synthesizing exactly sequenced halocarboxylic acid oligomers, methods of synthesizing exactly sequenced polyesters, various articles formed from exactly sequenced polyesters and methods of using such articles.

BRIEF DESCRIPTION OF THE DRAWING

FIG. 1 shows an exemplary suture of the present invention attached to a surgical needle.

DETAILED DESCRIPTION OF THE INVENTION

I. Definitions and Abbreviations

Unless defined otherwise, all technical and scientific terms used herein generally have the same meaning as commonly understood by one of ordinary skill in the art to which this invention belongs. Generally, the nomenclature used herein and the laboratory procedures in cell culture, molecular genetics, organic chemistry and nucleic acid chemistry and hybridization are those well known and commonly employed in the art. Standard techniques are used for nucleic acid and peptide synthesis. The techniques and procedures are generally performed according to conventional methods in the art and various general references, which are provided throughout this document. The nomenclature used herein and the laboratory procedures in analytical chemistry, and organic synthetic described below are those well known and commonly employed in the art. Standard techniques, or modifications thereof, are used for chemical syntheses and chemical analyses.

The term "alkyl," by itself or as part of another substituent, means, unless otherwise stated, a straight or branched chain, or cyclic hydrocarbon radical, or combination thereof, which may be fully saturated, mono- or polyunsaturated and can include di- and multivalent radicals, having the number of carbon atoms designated (i.e. $C_1$-$C_{10}$ means one to ten carbons). Examples of saturated hydrocarbon radicals include, but are not limited to, groups such as methyl, ethyl, n-propyl, isopropyl, n-butyl, t-butyl, isobutyl, sec-butyl, cyclohexyl, (cyclohexyl)methyl, cyclopropylmethyl, homologs and isomers of, for example, n-pentyl, n-hexyl, n-heptyl, n-octyl, and the like. An unsaturated alkyl group is one having one or more double bonds or triple bonds. Examples of unsaturated alkyl groups include, but are not limited to, vinyl, 2-propenyl, crotyl, 2-isopentenyl, 2-(butadienyl), 2,4-pentadienyl, 3-(1,4-pentadienyl), ethynyl, 1- and 3-propynyl, 3-butynyl, and the higher homologs and isomers. The term "alkyl," unless otherwise noted, is also meant to include those derivatives of alkyl defined in more detail below, such as "heteroalkyl." Alkyl groups, which are limited to hydrocarbon groups, are termed "homoalkyl".

The term "alkylene" by itself or as part of another substituent means a divalent radical derived from an alkane, as exemplified, but not limited, by —$CH_2CH_2CH_2CH_2$—, and further includes those groups described below as "heteroalkylene." Typically, an alkyl (or alkylene) group will have from 1 to 24 carbon atoms, with those groups having 10 or fewer carbon atoms being preferred in the present invention. A "lower alkyl" or "lower alkylene" is a shorter chain alkyl or alkylene group, generally having eight or fewer carbon atoms.

The terms "alkoxy," "alkylamino" and "alkylthio" (or thioalkoxy) are used in their conventional sense, and refer to those alkyl groups attached to the remainder of the molecule via an oxygen atom, an amino group, or a sulfur atom, respectively.

The term "heteroalkyl," by itself or in combination with another term, means, unless otherwise stated, a stable straight or branched chain, or cyclic hydrocarbon radical, or combinations thereof, consisting of the stated number of carbon atoms and at least one heteroatom selected from the group consisting of O, N, Si and S, and wherein the nitrogen and sulfur atoms may optionally be oxidized and the nitrogen heteroatom may optionally be quaternized. The heteroatom(s) O, N and S and Si may be placed at any interior position of the heteroalkyl group or at the position at which the alkyl group is attached to the remainder of the molecule. Examples include, but are not limited to, —$CH_2$—$CH_2$—O—$CH_3$, —$CH_2$—$CH_2$—NH—$CH_3$, —$CH_2$—$CH_2$—N($CH_3$)—$CH_3$, —$CH_2$—S—$CH_2$—$CH_3$, —$CH_2$—$CH_2$, —S(O)—$CH_3$, —$CH_2$—$CH_2$—S(O)$_2$—$CH_3$, —CH=CH—O—$CH_3$, —Si($CH_3$)$_3$, —$CH_2$—CH=N—$OCH_3$, and —CH=CH—N($CH_3$)—$CH_3$. Up to two heteroatoms may be consecutive, such as, for example, —$CH_2$—NH—$OCH_3$ and —$CH_2$—O—Si($CH_3$)$_3$. Similarly, the term "heteroalkylene" by itself or as part of another substituent means a divalent radical derived from heteroalkyl, as exemplified, but not limited by, —$CH_2$—$CH_2$—S—$CH_2$—$CH_2$— and —$CH_2$—S—$CH_2$—$CH_2$—NH—$CH_2$—. For heteroalkylene groups, heteroatoms can also occupy either or both of the chain termini (e.g., alkyleneoxy, alkylenedioxy, alkyleneamino, alkylenediamino, and the like). Still further, for alkylene and heteroalkylene linking groups, no orientation of the linking group is implied by the direction in which the formula of the linking group is written. For example, the formula —C(O)$_2$R'— represents both —C(O)$_2$R'— and —R'C(O)$_2$—.

In general, an "acyl substituent" is also selected from the group set forth above. As used herein, the term "acyl substituent" refers to groups attached to, and fulfilling the valence of a carbonyl carbon that is either directly or indirectly attached to the polycyclic nucleus of the compounds of the present invention.

The terms "cycloalkyl" and "heterocycloalkyl", by themselves or in combination with other terms, represent, unless otherwise stated, cyclic versions of "alkyl" and "heteroalkyl", respectively. Additionally, for heterocycloalkyl, a heteroatom can occupy the position at which the heterocycle is attached to the remainder of the molecule. Examples of cycloalkyl include, but are not limited to, cyclopentyl, cyclohexyl, 1-cyclohexenyl, 3-cyclohexenyl, cycloheptyl, and the like. Examples of heterocycloalkyl include, but are not limited to, 1-(1,2,5,6-tetrahydropyridyl), 1-piperidinyl, 2-piperidinyl, 3-piperidinyl, 4-morpholinyl, 3-morpholinyl, tetrahydrofuran-2-yl, tetrahydrofuran-3-yl, tetrahydrothien-2-yl, tetrahydrothien-3-yl, 1-piperazinyl, 2-piperazinyl, and the like.

The terms "halo" or "halogen," by themselves or as part of another substituent, mean, unless otherwise stated, a fluorine, chlorine, bromine, or iodine atom. Additionally, terms such as "haloalkyl," are meant to include monohaloalkyl and polyhaloalkyl. For example, the term "halo($C_1$-$C_4$)alkyl" is mean to include, but not be limited to, trifluoromethyl, 2,2,2-trifluoroethyl, 4-chlorobutyl, 3-bromopropyl, and the like.

The term "aryl" means, unless otherwise stated, a polyunsaturated, aromatic, hydrocarbon substituent, which can be a single ring or multiple rings (preferably from 1 to 3 rings), which are fused together or linked covalently. The term "heteroaryl" refers to aryl groups (or rings) that contain from one to four heteroatoms selected from N, O, and S, wherein the nitrogen and sulfur atoms are optionally oxidized, and the nitrogen atom(s) are optionally quaternized. A heteroaryl group can be attached to the remainder of the molecule through a heteroatom. Non-limiting examples of aryl and heteroaryl groups include phenyl, 1-naphthyl, 2-naphthyl, 4-biphenyl, 1-pyrrolyl, 2-pyrrolyl, 3-pyrrolyl, 3-pyrazolyl, 2-imidazolyl, 4-imidazolyl, pyrazinyl, 2-oxazolyl, 4-oxazolyl, 2-phenyl-4-oxazolyl, 5-oxazolyl, 3-isoxazolyl, 4-isoxazolyl, 5-isoxazolyl, 2-thiazolyl, 4-thiazolyl, 5-thiazolyl, 2-furyl, 3-furyl, 2-thienyl, 3-thienyl, 2-pyridyl, 3-pyridyl, 4-pyridyl, 2-pyrimidyl, 4-pyrimidyl, 5-benzothiazolyl, purinyl, 2-benzimidazolyl, 5-indolyl, 1-isoquinolyl, 5-isoquinolyl, 2-quinoxalinyl, 5-quinoxalinyl, 3-quinolyl, and 6-quinolyl. Substituents for each of the above noted aryl and heteroaryl ring systems are selected from the group of acceptable substituents described below.

For brevity, the term "aryl" when used in combination with other terms (e.g., aryloxy, arylthioxy, arylalkyl) includes both aryl and heteroaryl rings as defined above. Thus, the term "arylalkyl" is meant to include those radicals in which an aryl group is attached to an alkyl group (e.g., benzyl, phenethyl, pyridylmethyl and the like) including those alkyl groups in which a carbon atom (e.g., a methylene group) has been replaced by, for example, an oxygen atom (e.g., phenoxymethyl, 2-pyridyloxymethyl, 3-(1-naphthyloxy)propyl, and the like).

Each of the above terms (e.g., "alkyl," "heteroalkyl," "aryl" and "heteroaryl") include both substituted and unsubstituted forms of the indicated radical. Preferred substituents for each type of radical are provided below.

Substituents for the alkyl, and heteroalkyl radicals (including those groups often referred to as alkylene, alkenyl, heteroalkylene, heteroalkenyl, alkynyl, cycloalkyl, heterocycloalkyl, cycloalkenyl, and heterocycloalkenyl) are generally referred to as "alkyl substituents" and "heteroalkyl substituents," respectively, and they can be one or more of a variety of groups selected from, but not limited to: —OR', =O, =NR', =N—OR', —NR'R", —SR', -halogen, —SiR'R"R'", —OC(O)R', —C(O)R', —$CO_2$R', —CONR'R", —OC(O)NR'R", —NR"C(O)R', —NR'—C(O)NR"R'", —NR"C(O)$_2$R', —NR—C(NR'R"R'")=NR"", —NR—C(NR'R")=NR'", —S(O)R', —S(O)$_2$R', —S(O)$_2$NR'R", —NRSO$_2$R', —CN and —NO$_2$ in a number ranging from zero to (2m'+1), where m' is the total number of carbon atoms in such radical. R', R", R'" and R"" each preferably independently refer to hydrogen, substituted or unsubstituted heteroalkyl, substituted or unsubstituted aryl, e.g., aryl substituted with 1-3 halogens, substituted or unsubstituted alkyl, alkoxy or thioalkoxy groups, or arylalkyl groups. When a compound of the invention includes more than one R group, for example, each of the R groups is independently selected as are each R', R", R'" and R"" groups when more than one of these groups is present. When R' and R" are attached to the same nitrogen atom, they can be combined with the nitrogen atom to form a 5-, 6-, or 7-membered ring. For example, —NR'R" is meant to include, but not be limited to, 1-pyrrolidinyl and 4-morpholinyl. From the above discussion of substituents, one of skill in the art will understand that the term "alkyl" is meant to include groups including carbon atoms bound to groups other than hydrogen groups, such as haloalkyl (e.g., —$CF_3$ and —$CH_2CF_3$) and acyl (e.g., —C(O)$CH_3$, —C(O)$CF_3$, —C(O)$CH_2OCH_3$, and the like).

Similar to the substituents described for the alkyl radical, the aryl substituents and heteroaryl substituents are generally referred to as "aryl substituents" and "heteroaryl substituents," respectively and are varied and selected from, for example: halogen, —OR', =O, =NR', =N—OR', —NR'R", —SR', -halogen, —SiR'R"R'", —OC(O)R', —C(O)R', —$CO_2$R', —CONR'R", —OC(O)NR'R", —NR"C(O)R', —NR'—C(O)NR"R'", —NR"C(O)$_2$R', —NR—C(NR'R")=NR'", —S(O)R', —S(O)$_2$R', —S(O)$_2$NR'R", —NRSO$_2$R', —CN and —NO$_2$, —R', —N$_3$, —CH(Ph)$_2$, fluoro($C_1$-$C_4$)alkoxy, and fluoro($C_1$-$C_4$)alkyl, in a number ranging from zero to the total number of open valences on the aromatic ring system; and where R', R", R'" and R"" are preferably independently selected from hydrogen, ($C_1$-$C_8$)alkyl and heteroalkyl, unsubstituted aryl and heteroaryl, (unsubstituted aryl)-($C_1$-$C_4$)alkyl, and (unsubstituted aryl)oxy-($C_1$-$C_4$)alkyl. When a compound of the invention includes more than one R group, for example, each of the R groups is independently selected as are each R', R", R'" and R"" groups when more than one of these groups is present.

Two of the aryl substituents on adjacent atoms of the aryl or heteroaryl ring may optionally be replaced with a substituent of the formula -T-C(O)—(CRR')$_q$—U—, wherein T and U are independently —NR—, —O—, —CRR'— or a single bond, and q is an integer of from 0 to 3. Alternatively, two of the substituents on adjacent atoms of the aryl or heteroaryl ring may optionally be replaced with a substituent of the formula -A-($CH_2$)$_r$—B—, wherein A and B are independently —CRR'—, —O—, —NR—, —S—, —S(O)—, —S(O)$_2$—, —S(O)$_2$NR'— or a single bond, and r is an integer of from 1 to 4. One of the single bonds of the new ring so formed may optionally be replaced with a double bond. Alternatively, two of the substituents on adjacent atoms of the aryl or heteroaryl ring may optionally be replaced with a substituent of the formula —(CRR')$_s$—X—(CR"R'")$_d$—, where s and d are independently integers of from 0 to 3, and X is —O—, —NR'—, —S—, —S(O)—, —S(O)$_2$—, or —S(O)$_2$NR'—. The substituents R, R', R" and R'" are preferably independently selected from hydrogen or substituted or unsubstituted ($C_1$-$C_6$)alkyl.

As used herein, the term "heteroatom" includes oxygen (O), nitrogen (N), sulfur (S), phosphorus (P) and silicon (Si).

The term "labeling moiety" refers to a moiety, which provides a signal that is detectable by a detection method known in the art. The signal can be used to determine the location or concentration of the labeling moiety, for example, in an organism, a tissue sample or a reaction vial. Exemplary signals include color, emitted light of any wavelength, radioactivity, or any other electromagnetic or quantum mechanical effect. Exemplary labeling moieties include but are not limited to fluorescent molecules (e.g. fluorescein), luminescent moieties (e.g., transition-metal complexes), chemoluminescent molecules, molecules used in colorimetric applications (i.e. dye molecules), histochemical staining reagents, photo-affinity labels, magnetic resonance imaging (MRI) agents, radioactive labels, radiotracers and agents used in positron emission tomography (PET).

The term "targeting moiety" refers to a moiety, which is capable of binding to a particular tissue- or cell-type (e.g., tumor cells, neuronal or glial cells, liver cells, and the like) with at least some level of specificity. Exemplary targeting moieties are selected from carbohydrates, proteins, peptides, antibodies, and small-molecule ligands. In an exemplary embodiment, the targeting moiety is a ligand for a biological receptor, such as a cell surface receptor. In another exemplary embodiment, the targeting moiety is an antibody that is capable of binding to an antigen, such as a tissue- or tumor-specific antigen.

The term "drug moiety" refers to pharmaceutical drugs and other biologically active molecules. "Drug moiety" includes small-molecule drugs as well as biologics, including peptides, mutant and wild-type polypeptides, mutant and wild-type proteins, antibodies (e.g., humanized, monoclonal antibodies) and the like.

The term "water-soluble" refers to moieties that have a detectable degree of solubility in water. Methods to detect and/or quantify water solubility are well known in the art. Exemplary water-soluble polymers include peptides, saccharides, poly(ethers), poly(amines), poly(carboxylic acids) and the like. Peptides can have mixed sequences of be composed of a single amino acid, e.g., poly(lysine), poly(aspartic acid), and poly(glutamic acid). An exemplary polysaccharide is poly(sialic acid). An exemplary poly(ether) is poly(ethylene glycol), e.g., m-PEG. Poly(ethylene imine) is an exemplary polyamine, and poly(acrylic) acid is a representative poly (carboxylic acid).

As used herein, "pharmaceutically acceptable carrier" includes any material, which when combined with the conjugate retains the conjugates' activity and is non-reactive with the subject's immune systems. Examples include, but are not limited to, any of the standard pharmaceutical carriers such as a phosphate buffered saline solution, water, emulsions such as oil/water emulsion, and various types of wetting agents. Other carriers may also include sterile solutions, tablets including coated tablets and capsules. Typically such carriers contain excipients such as starch, milk, sugar, certain types of clay, gelatin, stearic acid or salts thereof, magnesium or calcium stearate, talc, vegetable fats or oils, gums, glycols, or other known excipients. Such carriers may also include flavor and color additives or other ingredients. Compositions comprising such carriers are formulated by well known conventional methods.

As used herein, "administering" means oral administration, administration as a suppository, topical contact, intravenous, intraperitoneal, intramuscular, intralesional, or subcutaneous administration, administration by inhalation, or the implantation of a slow-release device, e.g., a mini-osmotic pump, to the subject. Administration is by any route including parenteral and transmucosal (e.g., oral, nasal, vaginal, rectal, or transdermal), particularly by inhalation. Parenteral administration includes, e.g., intravenous, intramuscular, intra-arteriole, intradermal, subcutaneous, intraperitoneal, intraventricular, and intracranial. Moreover, where injection is to treat a tumor, e.g., induce apoptosis, administration may be directly to the tumor and/or into tissues surrounding the tumor. Other modes of delivery include, but are not limited to, the use of liposomal formulations, intravenous infusion, transdermal patches, etc.

II. The Compositions

Polyesters with precisely sequenced two or more structural units according to the present invention are those polyesters having a precise sequential monomeric order and this sequential segment of structural units repeats in the polymer chains. The ability to engineer the precise chain sequence and length permits regulation of chemical and physical properties such as crystallinity, and rates of hydrolysis of resulting polymers. As used herein, the terms "polyesters with precisely sequenced two or more structural units" and "sequential polyesters" are equivalent and are used interchangeably; the terms "oligomers with precisely sequenced two or more structural units" and "sequential oligomers" are equivalent and are used interchangeably.

In one aspect, the present invention provides a polymer derived from halocarboxylic acid.

By "polymer" herein is meant a substance composed of molecules with large molecular mass composed of repeating structural units, or monomers, connected by covalent chemical bonds. By "oligomers" herein is meant a polymer comprises of relative small number of monomeric units, generally from 2 to 20.

By "structural unit" herein is meant a building block of a polymer chain, and related to the repeat unit. It is the result of a monomer which has been polymerized into a long chain. When different monomers are polymerized, a copolymer is formed.

The oligomer can be homopolymer or heteropolymer. By "homopolymer" herein is meant a polymer derived from one monomer. For example, a homopolymer can have the formula of (-A-A-A-A-).

By "heteropolymer" or "copolymer" herein is meant a polymer derived from two (or more) monomeric species. Thus a copolymer can have the formula of (-A-B-), (-A-B-A-), (-A-B-C-), and the like.

By "copolymerization" herein is meant the processes used to chemically synthesize a copolymer. Copolymers may also be described in terms of the existence of or arrangement of branches in the polymer structure. Linear copolymers consist of a single main chain whereas branched copolymers consist of a single main chain with one or more polymeric side chains. Preferably, the polymer provided by the present invention are linear polymers.

In one aspect, the present invention provides halocarboxylic acid oligomers of Formula (I),

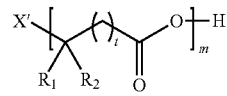

wherein $R_1$ and $R_2$ are members independently selected in each structural units from H, substituted or unsubstituted alkyl (substituted or unsubstituted cycloalkyl), substituted or unsubstituted heteroalkyl, substituted or unsubstituted heterocycloalkyl, substituted or unsubstituted aryl and substituted or unsubstituted heteroaryl, substituted or unsubstituted alkoxy, ester, nitro, amine, amide, OH, hydrazine, hydrazine, guanidine, amidine or thiol, X' is halogen F, Cl, Br, or I, m is an integer, and t is an integer (e.g., 0, 1, 2, 3, 4, 5, 6, and greater than 6).

In some embodiments, $R_1$ and $R_2$ are members independently selected from —$NO_2$, —OH, —$NH_2$, —SH, —COOR, —NH—$NH_2$, and —NH—C(NH)—$NH_2$, wherein R is substituted or unsubstituted alkyl.

In some embodiments, the polymer comprises four units and has the Formula (V):

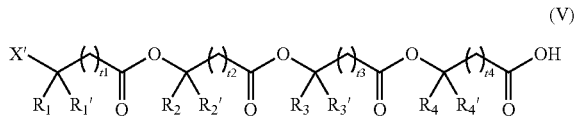

wherein $R_1$ and $R_2$ are members independently selected in each structural unit from H, substituted or unsubstituted alkyl (e.g., substituted or unsubstituted cycloalkyl), substituted or unsubstituted heteroalkyl, substituted or unsubstituted heterocycloalkyl, substituted or unsubstituted aryl and substituted or unsubstituted heteroaryl, substituted or unsubstituted alkoxy, ester, nitro, amine, amide, OH, hydrazine, hydrazine, guanidine, amidine or thiol, X' is halogen F, Cl, Br, or I, and t1, t2, t3 and t4 are each an independently selected integer (e.g., 0, 1, 2, 3, 4, 5, 6, and greater than 6)

In some embodiments, $R_1$ and $R_2$ are members independently selected from —$NO_2$, —OH, —$NH_2$, —SH, —COOR, —NH—$NH_2$, and —NH—C(NH)—$NH_2$, wherein R is substituted or unsubstituted alkyl.

In some embodiments, the present invention provides a halocarboxylic acid oligomer according to Formula (X):

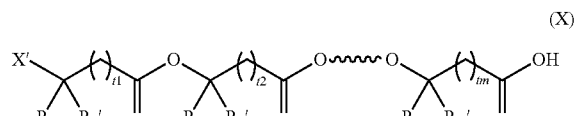

wherein $R_1$, $R'_1$, $R_2$, $R'_2$, $R_m$ and $R'_m$ are members independently selected, in each structural unit, from H, substituted or unsubstituted alkyl, substituted or unsubstituted alkoxy, ester, nitro, amine, amide, OH, hydrazine, hydrazine, guanidine, amidine and thiol; X' is halogen or another leaving group; m is selected from integers greater than or equal to 3; and t1, t2, . . . tm is an integer greater than or equal to 0.

The wavy line designates structural units intermediate to those found at the termini having substantially similar structure to the structural unit including $R_2$, $R_2'$ and t2 $CH_2$ moieties. Thus the oligomer comprises a plurality of monomer units (there are m units in Formula (X), and each units is denoted as 1, 2, 3, incrementally to m). Each units share a similar core structure, but may have same or different substitution groups ($R_1$, $R_1'$, $R_2$, $R_2'$ . . . $R_m$, $R_m'$) and $CH_2$ moieties (t1, t2 . . . tm).

In some embodiments, $R_1$ and $R_2$ are members independently selected in each structural unit from —$NO_2$, —OH, —$NH_2$, —SH, —COOR, —NH—$NH_2$, and —NH—C(NH)—$NH_2$, wherein R is substituted or unsubstituted alkyl.

In another aspect, the present invention provides periodic copolymers. By "periodic copolymer" herein is meant a copolymer with units arranged in a repeating sequence (e.g. (A-B-A-B-B-A-A-A-A-B-B-B)$_n$ In some embodiments, the present invent provides polymers that are derived from the oligomers provided herein. In some embodiments, the polymer comprises a plurality of oligomers assembled by polymerization of the oligomers. Thus the polymer has a plurality of repeating units, and each unit itself is derived from an oligomer as provided herein. In other words, an oligomer comprises of two or more monomeric unit is first made, with each monomeric unit is the same or different. Then the oligomers are further polymerized to produce a polymer.

In some embodiments, the polymers are alternating copolymers. By "alternating copolymer" herein is meant a copolymer with regular alternating units. For example, (-A-B-A-B-A-B-A-B-), or (-A-B-C-A-B-C-A-B-C-A-B-C-).

In some embodiments, the present invention provides a polymer of poly(hydroxy acids) with two or more precisely sequenced structural units, said polymer has the Formula (IX):

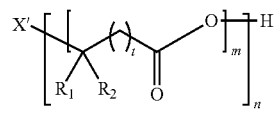

wherein $R_1$ and $R_2$ are members independently selected in each structural units from H, substituted or unsubstituted alkyl (e.g., substituted or unsubstituted cycloalkyl), substituted or unsubstituted heteroalkyl, substituted or unsubstituted heterocycloalkyl, substituted or unsubstituted aryl and substituted or unsubstituted heteroaryl, substituted or unsubstituted alkoxy, ester, nitro, amine, amide, OH, hydrazine, hydrazine, guanidine, amidine or thiol, X' is halogen F, Cl, Br, or I, m and n are integers, and t is an integer (e.g., 0, 1, 2, 3, 4, 5, 6, and greater than 6).

In some embodiments, $R_1$ and $R_2$ are members independently selected from —$NO_2$, —OH, —$NH_2$, —SH, —COOR, —NH—$NH_2$, and —NH—C(NH)—$NH_2$, wherein R is substituted or unsubstituted alkyl.

In some embodiments, the present invention provides a polymer of poly(hydroxy acids) with two or more precisely sequenced structural units, said polymer has the Formula (XI):

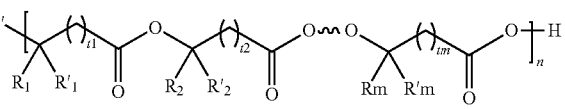

wherein $R_1$, $R_2$ . . . Rm and $R'_1$, $R'_2$ . . . R'm are members independently selected from H, substituted or unsubstituted alkyl, substituted or unsubstituted alkoxy, ester, nitro, amine, amide, or thiol, X' is halogen F, Cl, Br, or I, m, n is an integer, and t1, t2, . . . tm is an integer includes 0.

In some embodiments, $R_1$ and $R_2$ are members independently selected in each structural unit from —$NO_2$, —OH, —$NH_2$, —SH, —COOR, —NH—$NH_2$, and —NH—C(NH)—$NH_2$, wherein R is substituted or unsubstituted alkyl.

The wavy line designates structural units intermediate to those found at the termini having substantially similar structure to the structural unit including $R_2$, $R_2'$ and t2 $CH_2$ moieties, as described herein.

In various embodiments of the present invention, the indices m, n are independently selected from integers greater than 10, greater than 50, greater than 100, greater than 500, and greater than 1000. In certain embodiments, the indices m and n are independently selected from integers from 10 to 1000, from 10 to 500, from 10 to 100 and from 10 to 50. The invention provides compounds in which the indices m and n are independently selected from integers from 50 to 1000, from 50 to 500 and from 500 to 1000.

III. Method of Making

In another aspect, the present invention provides methods of manufacturing polyesters with precisely sequenced two or more structural units in present invention comprises of two major modules. In an exemplary embodiment, the first module involves building up a bifunctional, (e.g., one halo and one carboxylic group), precisely sequenced oligomer with two or more structural units, such as the oligomers according to Formula (I). The second module is to polymerize the bifunctional oligomer into a polyester in presence of a base (e.g., an alkyl amines, pyridines or imidazoles and their derivatives), such as through the following exemplary reaction:

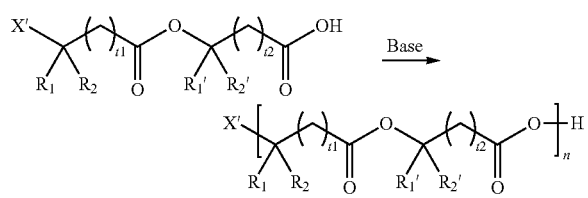

wherein each of the radicals and indices is as described hereinabove.

In an exemplary embodiment, halosequential oligomers in accordance with the present invention are made by reacting a halocarbonyl halide with a hydroxyacid to form a designed halocarboxylic acid dimer. Reaction of this halocarboxylic acid dimer with thionyl halide will produce a halodimer carbonyl halide. Reaction of this halodimer carbonyl halide with another desired hydroxyacid will produce a halocarboxylic acid trimer. Repeating the halidation of the carboxylic acid and the esterification with the desired hydroxyacid will extend the halooligomer until designed segment length, which has a reactive carboxylic group at the end, is reached. The structure of exemplary halocarboxylic acids is according to Formula (III):

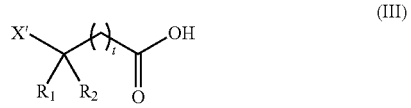

The radicals and indices are as set forth hereinabove.

The same sequential oligomers can also be synthesized by reaction of a halocarbonyl halide with an existing (pre-synthesized) sequential oligomer that, in an exemplary embodiment, is synthesized through the above-described halidation/esterification methodology or the method we set forth in an issued U.S. patent (Hermes and Huang, U.S. Pat. No. 5,349,047) with hydroxyl group deprotected. In embodiments utilizing a benzyl group for carboxylic group protection, such existing sequential oligomers can be deprotected on their protected carboxylic group as well to free reactive site before reacting with the halocarbonyl halide.

The condensation polymerization of sequential oligomers generally is undertaken under 100° C., in the most cases at room temperature with equal equivalent base. The conjugated acid of the base as a byproduct can be removed by washing with alcohol when the polymers synthesized are not soluble in alcohol or with $H_2O$ when the polymers synthesized are not soluble in water.

Hydroxyacids which are useful according to the present invention may be represented by the formula $HOCR_1R_2(CH_2)_tCOOH$, wherein $R_1$ and $R_2$ contain one hydrogen or alkyl groups and/or one or more carboxyl groups and is an essentially hydrocarbonaceous moiety, t could be zero or any natural number. By the phrase "essentially hydrocarbonaceous", it is meant that $R_1$ and $R_2$ may contain hetero atoms provided they do not inhibit polymerization to an unacceptable degree. If the homogeneous sequential polyester is meant to be hydrolyzable, such hetero atoms do not inhibit degradation of the polymer to an unacceptable degree. If the homogeneous sequential polyester is meant to be implantable, such hetero atoms do not give rise to toxic degradation products which may be difficult to metabolize. Suitable hydroxyacids include α-hydroxyacids such as glycolic acid ("G"), lactic acid ("L"), and α-hydroxyisobutyric acid ("αHB"); β-hydroxyacids such as β-hydroxybutyric acid ("βHB"); and γ-hydroxyacids such as γ-hydroxyvaleric acid ("γHV"). Preferred hydroxyacids in accordance with the present invention are α-hydroxyacids while the most preferred hydroxyacids are glycolic acid and lactic acid. It should be understood that these examples are merely illustrative and that any hydroxyacid capable of esterification is within the scope of the present invention. The sequential polyesters in this invention include sequential combinations of all the above-noted hydroxyacids. Thus, a sequential polyester can be constructed with one, two, three, four or more different hydroxyacids bonded together in a predetermined order. For example, a polyester can include the sequence G-G-L-L-αHB-αHB-HV-HV or G-L-αHBHV-G-L-αHB-HV or any conceivable combination of the various hydroxyacids described above. The general structure of hydroxyacids is according to Formula (IV):

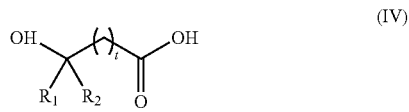

In which the radicals and indices are as described hereinabove.

Halocarbonyl halides which are important components of the present invention may be represented by formula $X'CR_1R_2(CH_2)_tCOX''$, wherein the X' and/or X" could be any halide such as F, Cl, Br, or I; and t could be any integer equal to or greater than zero. The X' and X" are not necessarily the same, though in some embodiments they are the same. Similarly, the halide X" in compounds of the invention that include a thionyl halide ($SOX''_2$) moiety can be any of F, Cl, Br or I: X' and X" are independently selected. All these halide will be removed in the reaction or followed polymerization and not be introduced into human body when applied in medical applications.

In some embodiments of the invention, particularly with regard to the polymerization, the function of a base is the elimination of a condensation polymerization byproduct, HX', wherein the X' is F, Cl, Br or I, depending upon which halide, X', was utilized in the sequential oligomers. Therefore the base could be any base that is not significantly reactive to the ester bond in the oligomers or those built up in the polymerization under the conditions of polymerization. Exemplary bases include alkyl amine, aniline, pyridine, imidazole or their derivatives.

The reaction of a halocarbonyl halide with a hydroxyacid in the synthesis of a halocarboxylic acid dimer appears complicated because both reactants have two reactive sites. However, due to the difference of reactivity of those reactive sites, the formation of possible byproducts is minimized, according to various embodiments of the present invention. In one embodiment, the formation of byproduct is limited by carefully selecting reaction conditions such as temperature and mole ratio of the reactants. For halocarbonyl halide, the carbonyl group is more reactive to nucleophilic attack agent than an alkyl halide and for hydroxyacid, the hydroxyl group is more strongly nucleophilic than the carboxylic group. Therefore, in various embodiments, the main reaction occurs between a hydroxyl group and a carbonyl halide and, accordingly, in certain embodiments, the protection of the carboxylic acid is not necessary at the mild temperature of the reaction. Reaction between a hydroxyl group and a carbonyl halide generally is assisted by addition of an amine or its derivatives to accelerate the reaction but this approach is avoided in this invention to prevent the activation of carboxylic acid happens by the amine. An important advantage of this reaction is the chiral properties of hydroxyl acid (if it is chiral) is maintained following the coupling reaction because it is the oxygen atom from hydroxyl group which attacks the carbonyl center. Therefore, in various embodiments, e.g., when the hydroxyacid is L-lactic acid epimerization does not occur in the growth reactions of producing sequential oligomers. The reaction of a halocarbonyl halide with a hydroxyacid is the following:

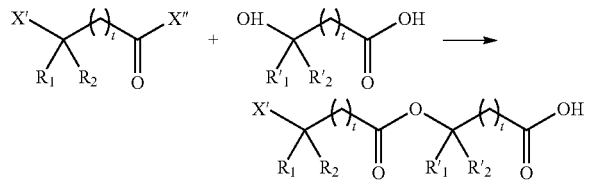

The identity of the radicals and indices is set forth hereinabove.

To continue the growth of the oligomer, e.g., to add a third hydroxyacid to the halocarboxylic acid dimer, there are several options such as, but not limited to, react the halodimer carboxylic acid with a third hydroxyacid directly, or esterification of the halodimer carboxylic acid with the third hydroxyacid with carboxylic acid protected in which the protection/deprotection methods will follow the same roadmap in the '047 patent. In various embodiments which utilize direct reaction with hydroxyacid, the carboxylic acid in the halodimer is optionally converted into a carbonyl halide first. In certain embodiments, such a conversion is accomplished by reacting the carboxylic acid with an appropriate agent, e.g., thionyl chloride, phosphorus pentachloride or phosphorus trihalide under mild conditions in which the existing ester bond is not cleaved. The halotrimer carboxylic acid produced thereby is chemically identical to the halodimer carboxylic acid (though greater in length) and, therefore, more hydroxyacid can be added similarly for the fourth, fifth hydroxyacid and so on until desired sequential oligomer length is reached.

In various embodiments, the reaction leading to the growth of a halocarboxylic acids oligomer is the follows:

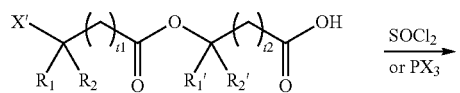

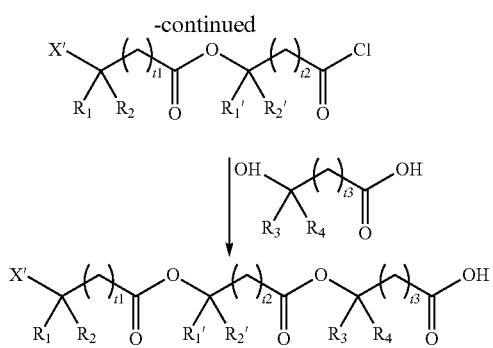

In which the identities of the radicals and indices is as set forth hereinabove.

In certain embodiments, the invention provides a method to synthesize sequential oligomers in this invention which relies on building up a sequential oligomer with a length of n−1 structural units where the n is the desired oligomer length of structural units first. Such a n−1 sequential oligomer can be manufactured according to the previous invention ('047 patent). In the practical examples, such a n−1 sequential oligomer is deprotected on its hydroxyl group first and then has its carboxylic group deprotected. The n−1 sequential oligomer with free hydroxyl and carboxylic group is chemically identical to hydroxyacid except for more esterbonds and therefore allowed to react with halocarbonyl halide of first desired structural unit to form a halosequential oligomer which will be used for polymerization later. To avoid epimerization during polymerization, the first structural unit should be designed to use non chiral at the halosubstituted carbon. For example, the haloacetyl halide is non chiral and can be utilized as first structural unit because its structure after polymerization is identical to glycolic acid in the polyester. Of course, if the epimerization is not a concern, any halocarbonyl halide as the desired hydroxyacid derivative can be utilized as first structural unit. The reaction of halocarbonyl halide with hydroxyacids oligomers is the following:

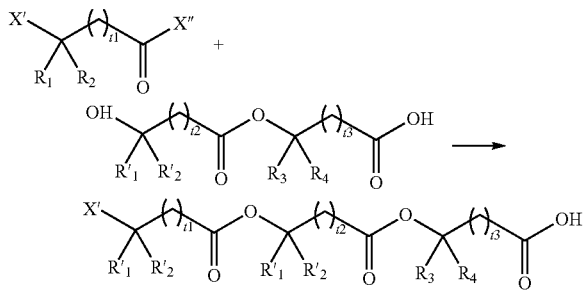

In which the identities of the radicals and indices is as set forth hereinabove.

In certain embodiments, the invention provides a method to synthesize sequential oligomers in this invention which relies on building up a sequential oligomer by addition of two structure units every time. Such a "double" addition can accelerate the synthesis of said oligomers. In the practical examples, such a double addition can be executed by reaction of halocarboxylic acid with glycolide or lactide (Structure IVa and Structure IVb). Glycolide and lactide are six member rings of glycolic acid dimer or lactic acid dimer. Such a six-member ring of dimer can be opened by attacking of a nucleophilic agent with catalyst of acid (typically Loews acid) or base. For example, the conjugate base of a helocarboxylic acid can service as a nucleophilic agent and attack the six member ring of the dimer with catalyst. The intermediate of the reaction will be an anhydride with a free hydroxy group. The hydroxy group then attack back to the carbonyl site with halogen substituted at alpha position. The resulted oligomer therefore will have a free acid at one end and halo at another end. The reaction of halocarboxylic acid with glycolide or lactide is the following:

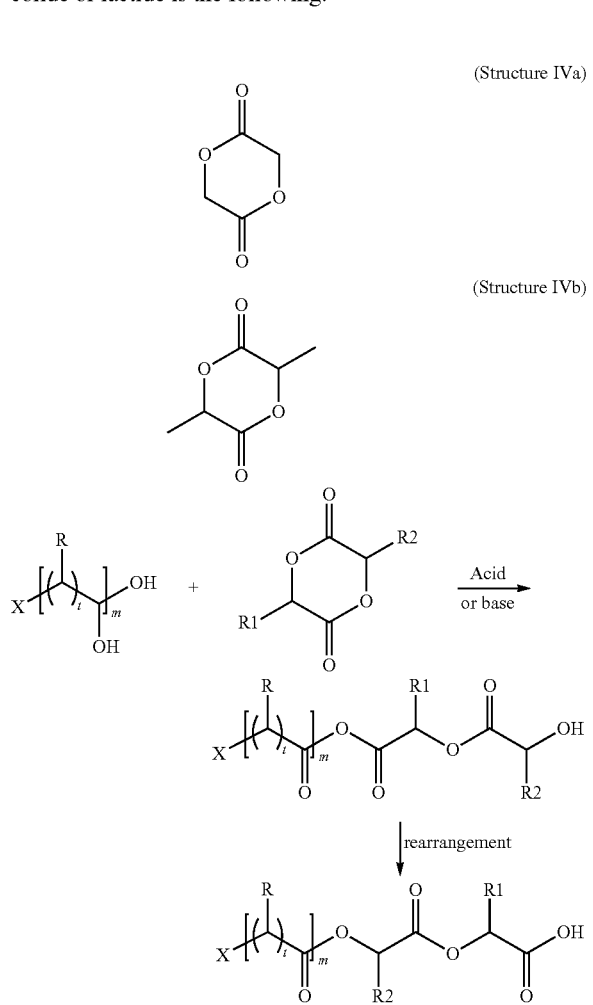

In which the identities of the radicals and indices is as set forth hereinabove.

In an exemplary embodiment, the polymerization of halosequential oligomers is conducted in common anhydrous solvents, e.g., diethyl ether, acetonitrile, acetone, ethyl acetate, chloroform or nitromethane under nitrogen protection. The selection of solvents is preferably made based upon the solubility of the sequential oligomers and the temperature of polymerization desired. In an exemplary embodiment, sequential oligomers are polymerized at room temperature in reasonable time. In various embodiments, the solvent is heated, e.g., to reflux, to accelerate the polymerization.

In exemplary polymerization methods of this invention, one equivalent of a base, e.g., alkyl amine, aniline, pyridine, imidazole or their derivatives is utilized to capture the condensation polymerization byproduct, hydrogen halide, so that the reaction progresses to polymerization. In some embodiments, under anhydrous conditions and mild temperature (below 100° C.), the concentration of $H^+$ is so low that ester exchange reaction does not occur to any significant degree because the conjugate acids of bases are weak acids.

In some embodiments, the base is a 5- or 6-membered aromatic heterocycle comprising at least one endocyclic nitrogen atom conjugate with another endocyclic or exocyclic nitrogen atom. Structure of some the base are according to Formula (V) to (VIII):

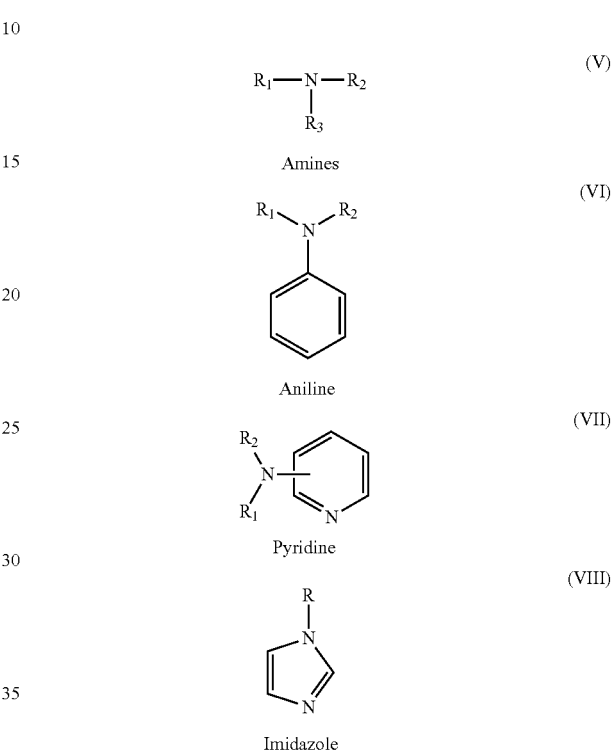

wherein R, $R_1$, $R_2$ are independently H or alkyl.

In some embodiments, the base is an amino-pyridine of Formula (VII), wherein $R_5$ and $R_6$ is, independently of each other, a $C_1$-$C_6$ alkyl radical, or $R_5$ and $R_6$ together form a 5- or 6-membered heterocycloalkyl, the —$NR_5$, $R_6$ group being in position 2 or 4. In some embodiments, the base is 4-dimethylamino pyridine.

In some embodiments the base is an imidazole of Formula (VIII), wherein R is a $C_1$-$C_6$ alkyl. In some embodiments, the base is N-methyl-imidazole.

In certain embodiments, in which the polyester is insoluble in a particular solvent, e.g., alcohol, the separation/purification of the polymer is effected by simply washing the polymer with a solvent in which it is insoluble yet in which impurities are soluble. For example, an amine hydrogen halide salt can be washed out with alcohol. In other embodiments, if the polymer is soluble in non-alcohol solvents, amine hydrogen halide salts can be precipitated in the non-alcohol solvents. The polymers of the invention are also readily purified using art-recognized chromatographic techniques, e.g.

Useful products made from sequential polyesters include fibrous surgical articles such as sutures, prosthetic ligaments, prosthetic tendons, woven mesh, gauze, dressings, growth matrices and the like. Such fibrous surgical articles may be engineered to be made more or less elastic depending upon end use. Portions of a single length of monofilament can be made to hydrolyze at different rates and to be more or less elastic than other portions. An exemplary suture in accordance with the present invention, suture 101, may be attached to a surgical needle 100 as shown in FIG. 1 by methods well known in the art. Wounds may be sutured by passing the needle suture through tissue to create a wound closure. The needle preferably is then removed from the suture and the suture is tied. Other medical articles can be manufactured from the sequential polyesters of the present invention. These include, but are not limited to, staples, clips and other fasteners, drug delivery devices, pins, screws and other implants. Implantable surgical articles made from the polyesters of this invention may be designed to be implanted into patients where the articles are hydrolyzed and absorbed. Drug delivery devices, as used herein, include any device or article of manufacture which is used to deliver a medicinal agent (drug moiety). The term "medicinal agent" (drug moiety) is used in its broadest sense and includes any substance or mixture of substances which are useful in medicine. Thus, it is understood that a medicinal agent may be a drug, enzyme, peptide, protein, dye, or diagnostic agent such as a releasable dye which may have no biological activity per se. Examples of various of medicinals (drug moieties) that can be used in accordance with the present invention include, without limitation, antimicrobials, analgesics, antipyretics, anesthetics, antiepileptics, antihistamines, anti-inflammatories, cardiovascular drugs, diagnostic agents, sympathomimetics, cholinomimetics, anti-muscarinics, antispasmodics, hormones, growth factors, muscle relaxants, adrenergic neuron blockers, anti-neoplastics, immunosuppressants, gastrointestinal drugs, diuretics, steroids and enzymes. It is also intended that combinations of medicinals can be used in accordance with the present invention. Sequential polyesters are well-suited for use as biodegradable polymers that are being used to address environmental concerns. For example, disposable staple items constructed from hydrolyzable sequential polyesters would biodegrade in landfills or in the ocean without leaving any toxic or non-degradable residue.

The sequential polyesters of the invention can also be targeted to specific cells, tissues, organs or regions by their conjugation to one or more targeting moiety. The polyesters and their conjugates can be detected in the body (e.g., contrast agents) or in experimental systems by their conjugation to one or more labeling moiety. As will be appreciated by those of skill in the art, a polyester of the invention can be conjugated to one or more than one moiety. For example, it is within the scope of the instant invention to prepare polyesters of the invention conjugated with a targeting moiety and a drug moiety. Similarly, a polyester of the invention can be conjugated to a labeling moiety and a targeting moiety. Moreover, a polyester of the invention can be conjugated to a cell or to a bioactive moiety that recognizes and interacts reversibly or irreversibly with a cell. Other useful conjugates based on the polyesters of the invention are apparent to one of skill and are within the scope and spirit of the instant invention.

IV. Applications

In one aspect, the present invention provides a medical device comprising a polymer according to the present invention. In various embodiments, the medical device is an implantable device, e.g., a suture, drug delivery device, graft, stent, dressing. The medical device can be conjugated to a drug moiety, a labeling moiety, a targeting moiety. In one embodiment, the medical device is conjugated to a bioactive moiety that interacts with a cell.

In various aspects, the present invention provides devices for time release drug delivery, an example of which is a polymeric microsphere. Exemplary microspheres comprises a polymer according the present invention and a drug moiety.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes.

REFERENCES CITED

U.S. Pat. No. 3,773,737 November 1973 Goodman et al.
U.S. Pat. No. 3,960,152 June 1976 Augurt et al.
U.S. Pat. No. 4,243,775 January 1981 Rosensaft et al.
U.S. Pat. No. 4,441,496 April 1984 Shalaby et al.
U.S. Pat. No. 4,481,353 November 1984 Nyilas et al.
U.S. Pat. No. 4,737,550 April 1988 Tomalia et al 528/363
U.S. Pat. No. 4,857,599 August 1989 Tomalia et al 528/363
U.S. Pat. No. 4,916,193 April 1990 Tang et al 528/354
U.S. Pat. No. 4,916,209 April 1990 Fung et al.
U.S. Pat. No. 4,920,203 April 1990 Tang et al. 528/354
U.S. Pat. No. 4,994,551 February 1991 Fung et al.
U.S. Pat. No. 5,030,703 July 1991 Pielartzik et al 528/176
U.S. Pat. No. 5,041,516 August 1991 Frechet et al 528/363
U.S. Pat. No. 5,066,772 November 1991 Tang et al. 528/354
U.S. Pat. No. 5,120,802 June 1992 Mares et al 528/354
U.S. Pat. No. 5,145,945 September 1992 Tang et al 528/354
U.S. Pat. No. 5,152,781 October 1992 Tang et al 528/354
U.S. Pat. No. 5,349,047 September 1994 Hermes et al
US 2007/0249654 A 1 October 2007 Bourissou et al Goodman et al., Polydepsipeptides I. Synthesis and Characterization of Copolymers of α-Amino and α-Hydroxy Acids, *Israel Journal of Chemistry*, vol. 10, pp. 867-879 (1972).

Goodman et al., Polydepsipeptides II: Synthesis and Preliminary Conformational Studies of an Alternating α-Amino and α-Hydroxy Acid Polymer, *Israel Journal of Chemistry*, vol. 12, Nos. 1-2, pp. 67-77 (1974).

Ingwall et al., Polydepsipeptides. III. Theoretical Conformational Analysis of Randomly Coiling and Ordered Depsipeptide Chains, *Macromolecules*, vol. 7, No. 5, pp. 598-605 (1974).

Ingwall et al., Polydepsipeptides. 5. Experimental Conformational analysis of Poly(L-alanyl-L-Lactic acid) and Related Model Compounds, *Macromolecules* vol. 9, No. 5, pp. 802-808 (1976).

Mathias et al., Polydepsipeptides. 6. Synthesis of Sequential Polymers Containing Varying Ratios of L-Alanine and L-Lactic Acid, *Macromolecules*, vol. 11, No. 3, pp. 534-539 (1978).

Goodman, Matrix-Controlled Synthesis and Conformational Studies of Polydepsipeptides, *Journal of Polymer Science: Polymer Symposium* 62, 173-188 (1978).

Ravi Subramanyam et al., New High Yield, One-Step Synthesis of Polyglycolide from Haloacetic acids, *Journal of Polymer Science: Polymer Edition*, Vol 22, pp. 1131-1140 (1984).

Mattias Epple et al., A Detailed characterization of polyglycolide prepared by solid-state polymerization reaction, *Macromol. Chem. Phys.* Vol 200, pp 2221-2229 (1999).

EXAMPLES

Example 1

Construction of Halocarboxylic Acid Dimer

Construction of bromoacetyl-(L)lactic acid dimer. To a solution of L-lactic acid (BioSynth) (22.88 gram, 0.254 mole) in $CH_3CN$ (100 ml) was added dropwisely bromoacetyl chloride (TCI) (20 gram, 0.127 mole) in $CH_3CN$ (100 ml) with stirring at reflux temperature for 16 hours. The solution was then cooled down to room temperature and the solvent $CH_3CN$ was removed in vacuum. The residual mixtures was dissolved in DI $H_2O$ (200 ml) and extracted with 2×200 ml ethyl acetate. The combined organic phase was washed with NaCl saturated aq. Solution (200 ml) and dried with $MgSO_4$. A light yellowish liquid crude product was obtained after the solvent ethyl acetate was removed in vacuum. The crude product is vacuum distilled. The exact vacuum is not recorded but the temperature was at 110° C.~120° C. The final product (23.37 gram) is obtained with yield of 87%. $^1$H NMR: (400 Mz, $CDCl_3$): δ11.5 (b, 1H); δ5.182 (q, 1H, J=6.8 Hz); δ3.926 (s, 2H); δ1.589 (d, 3H, J=6.8 Hz);

Example 2

Construction of Polyester from Halocarboxylic Acid Dimer

Construction of alternative copolymer of glycolic acid and L-lactic acid. To a solution of bromoacetyl-(L)-lactic acid (3.165 gram, 0.015 mole) in diethyl ether anhydrous (10 ml) was added dropwisely triethylamine (J.T. Baker) (1.518 gram, 0.015 mole) in diethyl ether anhydrous (10 ml) with stirring at room temperature (22° C.). The solution turned cloudy while the half of amine was added and the temperature raised as the flask was felt warm. White precipitate was deposited to the flask wall in about 2~3 hours. The solution was allowed to stand with stirring at room temperature for 3 days and ether was then poured out. The residual precipitate was stirred with ethanol (50 ml) for two hours at room temperature and white powder was obtained (1.1 gram) with yield of 56.4% after filtration. $^1$H NMR (400 Mz, DMSO): δ1.469 (d, 3H, J=7.2 Hz); δ4.875 (dd, 2H, J=40.8, 24.4 Hz); δ5.237 (q, 1H, J=6.8 Hz); $^{13}$C NMR (400 Hz, $CH_3CN$): δ16.450 (1C); δ61.142 (1C); δ69.380 (1C); δ167.079 (1C); δ169.874 (1C).

Example 3

Construction of Halocarboxylic Acid Trimer

Construction of bromoacetyl-(L)-lactiyl-(L)-lactic acid trimer (BrGLL). To a solution of bromoacetyl-L-lactic acid (6.33 gram, 0.03 mole) in anhydrous acetone (50 ml) is added thionyl chloride (4.89 gram, 0.041 mole) and refluxed at 60° C. for 16 hours. The reaction is monitored with HPLC and when all bromoacetyl-L-lactic acid is reacted, a solution of L-lactic acid (BioSynth) (5.4 gram, 0.06 mole) in acetone (50 ml) is added. The solution is continually refluxed for another 16 hours. The solution is then cooled down to room temperature and the solvent acetone is removed in vacuum. The residual mixtures is dissolved in DI $H_2O$ (100 ml) and extracted with 3×100 ml ethyl acetate. The combined organic phase is washed with NaCl saturated aq. Solution (100 ml) and dried with $MgSO_4$. The product is obtained after the solvent ethyl acetate is removed in vacuum.

Example 4

Construction of Halocarboxylic Acid Trimer

Construction of bromoacetyl-(L)-lactiyl-glycolic acid trimer (BrGLG). To a solution of bromoacetyl-L-lactic acid (6.33 gram, 0.03 mole) in anhydrous acetone (50 ml) is added thionyl chloride (4.89 gram, 0.041 mole) and refluxed at 60° C. for 16 hours. The reaction is monitored with HPLC and when all bromoacetyl-L-lactic acid is reacted, a solution of glycolic acid (Sigma-Aldrich) (4.563 gram, 0.06 mole) in acetone (50 ml) is added. The solution is continually refluxed for another 16 hours. The solution is then cooled down to room temperature and the solvent acetone is removed in vacuum. The residual mixtures is dissolved in DI $H_2O$ (100 ml) and extracted with 3×100 ml ethyl acetate. The combined organic phase is washed with NaCl saturated aq. Solution (100 ml) and dried with $MgSO_4$. The product is obtained after the solvent ethyl acetate is removed in vacuum.

Example 5

Construction of Hydroxyacid Dimer

Construction MEM protected glycolate (MEMGBen). To a solution of MEM chloride (Sigma-Aldrich) (50 gram, 0.401 mole) in ethyl acetate (200 ml) was added diisopropylethylamine (TCI) (70 ml, 0.401 mole) at 0° C. Benzyl glycolate (50 gram, 0.301 mole) was followed dropwisely. After two hours the solution was then heated up to reflux at 82° C. for 16 hours and the HPLC shown all Benzyl glycolate was converted. The solution was added with DI $H_2O$ (300 ml) after cooled down to room temperature and the organic phase is separated. The water phase is extracted with 200 ml, 200 ml, 100 ml ethyl acetate and all organic phase were combined and washed with 1% HCl (200 ml, 100 ml), $NaHCO_3$ saturated aq. solution (200 ml), NaCl saturated aq. solution (200 ml). Product (76 gram, 99% of yield) was obtained after the solvent ethyl acetate was removed in vacuum.

Deprotection of carboxylic acid of the MEM protected glycolate. To a solution of MEMGBen (88 gram, 0.346 mole) in THF (150 ml) was added Pd/C (Sigma-Aldrich, 10%) (3.0 gram). The solution was dealterated three times with $H_2$ and shaken under 65~70 psi $H_2$ with PARR shaker for 16 hours. The solution was then filtrated through Celite 545 and the product MEMG (56 gram, yield 98.6%) was obtained after solvent is removed in vacuum.

Construction of MEMGLBen dimer. To a solution of MEMG (39 g, 0.238 mole) and L-Benzyl (28.8 g, 0.160 mole) in acetonitrile (Aldrich) (250 ml) containing a trace amount of 4-dimethylaminopyridine (DMAP) (Aldrich) was added DCDI (Aldrich) (49.5 g, 0.238 mole) with stirring at room temperature. The solution was allowed to stand overnight with stirring at room temperature. The precipitate was filtered and the filtrate was concentrated in vacuum. The residue was diluted with 30 ml ethyl ether and filtered again to remove solid. The solvent was removed in vacuum and 52.3 g liquid product was collected. The product was applied in two portions to a column of 450 g Silica gel 60 (EM, 63-200 mm of particle size) and eluted with methylene chloride and ethyl acetate (2:1 in v/v) 48.1 g product was obtained with yield of 92.1%. $^1$H NMR (400 Mz, $CDCl_3$) δ1.52 (d, 3H, J=7.3 Hz);

δ 3.39 (s, 3H); δ 3.55 (t, 2H, J=3.6 Hz); δ 3.74 (t, 2H, J=3.6 Hz); δ 4.28 (s, 2H); δ 4.80 (s, 2H); δ 5.18 (s, 2H); δ 5.21 (q, 1H, J=7.3 Hz); δ 7.34-7.35 (m, 5H); $^{13}C$ NMR (400 Mz, $CDCl_3$) δ 169.96 (1C); 169.44 (1C); 135.17 (1C); 128.49 (2C); 128.30 (1C); 127.99 (2C); 95.29 (1C); 71.55 (1C); 68.81 (1C); 67.29 (1C); 66.95 (1C); 63.98 (1C); 58.80 (1C); 16.72 (1C).

Deprotection of hydroxyl group of MEMGLBen. To a solution of MEMGLBen (23.0 gram, 0.07 mole) in ethyl acetate (300 ml) was added NaI (10.5 g, 0.07 mole) and trimethylchlorosilane (TMCS, Sigma-Aldrich) (9.0 ml, 0.07 mole) in the bath of dry ice/isopropyl alcohol mixture. Another equivalent NaI/TMCS was followed 20 minutes later. After 20 minutes, another 2 equivalents NaI/TMCS were followed at the low temperature. The mixture was stirred at the low temperature until the temperature of the solution raised to room temperature naturally. The solution was stirred for another 16 hours at room temperature and HPLC shown there is no more MEMGLBen. The solution is poured into 400 ml Sat. $NaHCO_3$ aq. solution with stirring and separated. The water phase was extracted with 200 ml ethyl acetate. The organic phases were combined and shaken with $Na_2S_2O_8$ (90 gram in 300 ml DI $H_2O$) solution and then washed with Saturated NaCl aq. solution (300 ml). Crude product was obtained when the solvent is removed in vacuum after the solution was dried with $MgSO_4$. The crude product was applied to 350 gram Silica Gel 60 and eluted with $CH_2Cl_2$/ethyl acetate (6:1 in v/v). Product GLBen (13.3 gram, yield 80%) was collected.

Deprotection of carboxylic acid group of GLBen. To a solution of MEMGBen (7.15 gram, 0.03 mole) in THF (100 ml) was added Pd/C (Sigma-Aldrich, 10%) (0.3 gram). The solution was dealterated three times with $H_2$ and shaken under 65~70 psi $H_2$ with PARR shaker for 16 hours. The solution was then filtrated through Celite 545 and the product GL (4.38 gram, yield 98.6%) was obtained after solvent was removed in vacuum.

Example 6

Construction of Halohydroxyl Carboxylic Acid Oligomer

Construction of bromoacetyl-glycolyl-L-lactic acid (BrGGL). To a solution of GL (4.0 gram, 0.027 mole) in $CH_3Cl$ (30 ml) is added dropwisely bromoacetyl chloride (TCl) (8.5 gram, 0.054 mole) in $CH_3Cl$ (30 ml) with stirring at reflux temperature for 16 hours. The solution is then cooled down to room temperature and the solvent $CH_3Cl$ is removed in vacuum. The residual mixtures is dissolved in DI $H_2O$ (100 ml) and extracted with 2×100 ml ethyl acetate. The combined organic phase is washed with NaCl saturated aq. Solution (100 ml) and dried with $MgSO_4$. The crude product is obtained after the solvent ethyl acetate is removed in vacuum.

Example 7

Construction of Sequential Polyester from Halosequential Oligomer

Construction of polyester from BrGLG. To a solution of BrGLG (4.036 gram, 0.015 mole) in diethyl ether anhydrous (10 ml) is added dropwisely triethylamine (J.T. Baker) (1.518 gram, 0.015 mole) in diethyl ether anhydrous (10 ml) with stirring at room temperature (22° C.). The solution turned cloudy while the half of amine is added and the temperature raised as the flask is felt warm. White precipitate is deposited to the flask wall in about 2~3 hours. The solution is allowed to stand with stirring at room temperature for 3 days and ether is then poured out. The residual precipitate is stirred with ethanol (50 ml) for two hours at room temperature and white powder is collected after filtration.

Example 8

Construction of Sequential Polyester from Halosequential Oligomer

Construction of polyester from BrGLL. To a solution of BrGLL (4.246 gram, 0.015 mole) in diethyl ether anhydrous (10 ml) is added dropwisely triethylamine (J.T. Baker) (1.518 gram, 0.015 mole) in diethyl ether anhydrous (10 ml) with stirring at room temperature (22° C.). The solution turned cloudy while the half of amine is added and the temperature raised as the flask is felt warm. White precipitate is deposited to the flask wall in about 2~3 hours. The solution is allowed to stand with stirring at room temperature for 3 days and ether is then poured out. The residual precipitate is stirred with ethanol (50 ml) for two hours at room temperature and white powder is collected after filtration.

Example 9

Construction of Sequential Polyester from Halosequential Oligomer

Construction of polyester from BrGGL. To a solution of BrGGL (4.036 gram, 0.015 mole) in diethyl ether anhydrous (10 ml) is added dropwisely triethylamine (J.T. Baker) (1.518 gram, 0.015 mole) in diethyl ether anhydrous (10 ml) with stirring at room temperature (22° C.). The solution turned cloudy while the half of amine is added and the temperature raised as the flask is felt warm. White precipitate is deposited to the flask wall in about 2~3 hours. The solution is allowed to stand with stirring at room temperature for 3 days and ether is then poured out. The residual precipitate is stirred with ethanol (50 ml) for two hours at room temperature and white powder is collected after filtration.

Example 10

Construction of Halocarboxylic Acid Trimer

Construction of bromoacetyl-(L)-lactiyl-(L)-lactic acid trimer(BrGLL). To a solution of bromoacetic acid (BrG, 13.9 g, 0.1 mole) and lactide (LL, 14.4 g, 0.1 mole) in 200 ml anhydrous $CH_3CN$ is added Tin (IV) chloride (2.6 g). The mixture is refluxed for 24 hours and then cool don to room temperature. The solvent $CH_3CN$ is removed in vacuum and the residue is dissolved in ethyl acetate. The organic solution is washed with 1% HCl and Saturated NaCl aqueous solution and dried with $MgSO_4$. The product is obtained after the solvent is removed in vacuum.

Example 11

Construction of Halocarboxylic Acid Trimer

Construction of bromopropionyl-glycoyl-glycolic acid trimer (BrLGG). To a solution of 2-Bromopropionic acid (BrL, 15.3 g, 0.1 mole) and glycolide (GG, 11.6 g, 0.1 mole) in 200 ml anhydrous $CH_3CN$ is added Tin (IV) chloride (2.6 g). The mixture is refluxed for 24 hours and then cool don to room temperature. The solvent $CH_3CN$ is removed in vacuum and the residue is dissolved in ethyl acetate. The organic solution is washed with 1% HCl and Saturated NaCl aqueous solution and dried with $MgSO_4$. The product is obtained after the solvent is removed in vacuum.

Example 12

Construction of Halocarboxylic Acid Trimer

Construction of bromoacetyl-(L)-glycoyl-(L)-lactic acid trimer(BrGGL). To a solution of bromoacetic acid (BrG, 13.9 g, 0.1 mole) and 3-methyl-1,4-dioxane-2,5-dione (GL, 13.0 g, 0.1 mole) in 200 ml anhydrous $CH_3CN$ is added Tin (IV) chloride (2.6 g). The mixture is refluxed for 24 hours and then cool don to room temperature. The solvent $CH_3CN$ is removed in vacuum and the residue is dissolved in ethyl acetate. The organic solution is washed with 1% HCl and Saturated NaCl aqueous solution and dried with $MgSO_4$. The product is obtained after the solvent is removed in vacuum.

Example 13

Construction of Halocarboxylic Acid Trimer

Construction of bromoacetyl-(L)-lactiyl-(L)-lactic acid trimer(BrGLL). To a solution of bromoacetic acid (BrG, 13.9 g, 0.1 mole) and lactide (LL, 14.4 g, 0.1 mole) in 200 ml anhydrous $CH_3CN$ is added pyridine (0.8 g). The mixture is refluxed for 24 hours and then cool don to room temperature. The solvent $CH_3CN$ is removed in vacuum and the residue is dissolved in ethyl acetate. The organic solution is washed with 1% HCl and Saturated NaCl aqueous solution and dried with $MgSO_4$. The product is obtained after the solvent is removed in vacuum.

Example 14

Construction of Halocarboxylic Acid Trimer

Construction of bromopropionyl-glycoyl-glycolic acid trimer(BrLGG). To a solution of 2-Bromopropionic acid (BrL, 15.3 g, 0.1 mole) and glycolide (GG, 11.6 g, 0.1 mole) in 200 ml anhydrous $CH_3CN$ is added pyridine (0.8 g). The mixture is refluxed for 24 hours and then cool don to room temperature. The solvent $CH_3CN$ is removed in vacuum and the residue is dissolved in ethyl acetate. The organic solution is washed with 1% HCl and Saturated NaCl aqueous solution and dried with $MgSO_4$. The product is obtained after the solvent is removed in vacuum.

Example 15

Construction of Halocarboxylic Acid Trimer

Construction of bromoacetyl-(L)-glycoyl-(L)-lactic acid trimer(BrGGL). To a solution of bromoacetic acid (BrG, 13.9 g, 0.1 mole) and 3-methyl-1,4-dioxane-2,5-dione (GL, 13.0 g, 0.1 mole) in 200 ml anhydrous $CH_3CN$ is added pyridine (0.8 g). The mixture is refluxed for 24 hours and then cool don to room temperature. The solvent $CH_3CN$ is removed in vacuum and the residue is dissolved in ethyl acetate. The organic solution is washed with 1% HCl and Saturated NaCl aqueous solution and dried with $MgSO_4$. The product is obtained after the solvent is removed in vacuum.

What is claimed is:

1. A halocarboxylic acid oligomer comprising a plurality of structural units according to the following Formula (I):

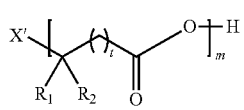
(I)

wherein X' is F, Cl, Br, or I,
m is a positive integer, and
t is 0 or a positive integer;
wherein $R_1$ and $R_2$ are members independently selected in each structural unit from the group consisting of $—NO_2$, $—OH$, $—NH_2$, $—SH$, $—COOR$, $—NH—NH_2$, and $—NH—C(NH)—NH_2$, wherein R is substituted or unsubstituted alkyl.

2. A polymer of poly(hydroxy acids) with two or more precisely sequenced structural units, said polymer having the Formula (IX):

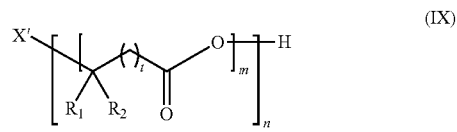
(IX)

wherein X' is F, Cl, Br, or I,
m and n are positive integers, and
t is 0 or a positive integer;
wherein $R_1$ and $R_2$ are members independently selected in each structural unit from the group consisting of $—NO_2$, $—OH$, $—NH_2$, $—SH$, $—COOR$, $—NH—NH_2$, and $—NH—C(NH)—NH_2$, wherein R is substituted or unsubstituted alkyl.

3. A method for preparing a polymer of poly(hydroxy acids) with two or more precisely sequenced structural units, comprising the steps of
(a) polymerizing halocarboxylic acid oligomers of Formula (I),

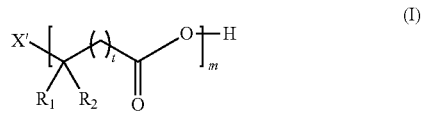
(I)

in an organic solvent at a reaction temperature between −20 and 200° C. to generate said polymer,
wherein $R_1$ and $R_2$ are members independently selected in each structural unit from H, substituted or unsubstituted alkyl, substituted or unsubstituted heteroalkyl, substituted or unsubstituted cycloalkyl, substituted or unsubstituted heterocycloalkyl, substituted or unsubstituted aryl, substituted or unsubstituted heteroaryl, substituted or unsubstituted alkoxy, ester, nitro, amine, amide, or thiol,
X' is F, Cl, Br, or I,
m is a positive integer, and
t is 0 or a positive integer; and
(b) recovering said polymer,
wherein said polymerizing step is performed in a controlled manner in presence of a base, said base being selected from the group consisting of amines and 5- and 6-membered aromatic heterocycles comprising at least one endocyclic nitrogen atom.

4. The method according to claim 3, wherein $R_1$ and $R_2$ are members independently selected in each structural unit from the group consisting of $—NO_2$, $—OH$, $—NH_2$, $—SH$, $—COOR$, $—NH—NH_2$, and $—NH—C(NH)—NH_2$, wherein R is substituted or unsubstituted alkyl.

5. The method according to claim 3, wherein said reaction temperature is between 0 and 100° C.

6. The method according to claim 5, wherein said reaction temperature is between 20 and 60° C.

7. The method according to claim 3, further comprising, before the recovering step, a step of purifying said polymer following the polymerizing step.

8. The method according to claim 3, wherein said $R_1$ and $R_2$ are members independently selected from the group consisting of hydrogen, methyl, and phenyl.

9. The method according to claim 3, wherein said base is a 5- or 6-membered aromatic heterocycle comprising at least one endocyclic nitrogen atom conjugated with another endocyclic or exocyclic nitrogen atom.

10. The method according to claim 9, wherein said base is an amino-pyridine of Formula (VII):

(VII)

wherein $R_5$ and $R_6$ are, independently of each other, a $C_1$-$C_6$ alkyl radical, or $R_5$ and $R_6$ together form a 5- or 6-membered heterocycloalkyl, the —$NR_5R_6$ group being in position 2 or 4.

11. The method according to claim 9, wherein said base is 4-dimethylaminopyridine.

12. The method according to claim 9, wherein said base is an imidazole of Formula (VIII):

(VIII)

wherein R is a $C_1$-$C_6$ alkyl.

13. The method according to claim 12, wherein said base is N-methyl-imidazole.

14. The method according to claim 3, wherein said organic solvent is an anhydrous solvent.

15. The method according to claim 3, wherein said organic solvent is selected from the group consisting of chlorinated aliphatic solvents, ethers, cyclic ethers, and aromatics.

16. A polyester having a predetermined monomeric sequence formed by a process according to claim 3.

17. A medical device comprising a polymer according to claim 2.

18. Polymeric microspheres for controlled release drug delivery, said microspheres comprising the polymer according to claim 2.

19. A periodic copolymer comprising a plurality of oligomer units, wherein said oligomer units comprise a plurality of structural units according to Formula (I):

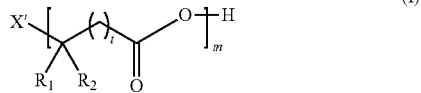

(I)

wherein X' is F, Cl, Br, or I,
m is a positive integer, and
t is 0 or a positive integer;

wherein $R_1$ and $R_2$ are members independently selected in each structural unit from the group consisting of —$NO_2$, —OH, —$NH_2$, —SH, —COOR, —NH—$NH_2$, and —NH—C(NH)—$NH_2$, wherein R is substituted or unsubstituted alkyl.

20. A halocarboxylic acid oligomer according to Formula (X):

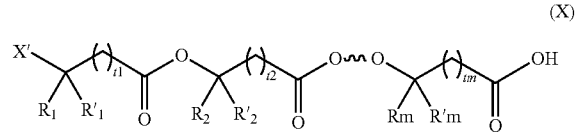

(X)

wherein X' is halogen or another leaving group;
m is selected from integers greater than or equal to 3; and
t1, t2, . . . tm are 0 or positive integers;
wherein $R_1$, $R'_1$, $R_2$, $R'_2$, $R_m$ and $R'_m$ are members independently selected in each structural unit from the group consisting of —$NO_2$, —OH, —$NH_2$, —SH, —COOR, —NH—$NH_2$, and —NH—C(NH)—$NH_2$, wherein R is substituted or unsubstituted alkyl.

21. A polymer of poly(hydroxy acids) with two or more precisely sequenced structural units, said polymer having the Formula (XI):

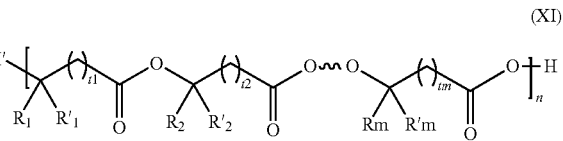

(XI)

wherein X' is F, Cl, Br, or I,
m and n are positive integers, and
t1, t2, . . . tm are 0 or positive integers;
wherein $R_1$, $R_2$ . . . $R_m$ and $R'_1$, $R'_2$ . . . $R'_m$ are members independently selected in each structural unit from the group consisting of —$NO_2$, —OH, —$NH_2$, —SH, —COOR, —NH—$NH_2$, and —NH—C(NH)—$NH_2$, wherein R is substituted or unsubstituted alkyl.

22. The method according to claim 3, wherein said base is alkyl amine.

* * * * *